United States Patent
Stenneth et al.

(10) Patent No.: US 12,371,037 B2
(45) Date of Patent: Jul. 29, 2025

(54) METHOD, APPARATUS AND COMPUTER PROGRAM PRODUCT FOR VEHICLE FEATURE EMULATION

(71) Applicant: HERE GLOBAL B.V., Eindhoven (NL)

(72) Inventors: Leon Stenneth, Chicago, IL (US); Jeremy Michael Young, Chicago, IL (US); Jerome Beaurepaire, Nantes (FR)

(73) Assignee: HERE GLOBAL B.V., Eindhoven (NL)

( * ) Notice: Subject to any disclaimer, the term of this patent is extended or adjusted under 35 U.S.C. 154(b) by 221 days.

(21) Appl. No.: 18/067,382

(22) Filed: Dec. 16, 2022

(65) Prior Publication Data

US 2024/0199042 A1    Jun. 20, 2024

(51) Int. Cl.
| | |
|---|---|
| *B60W 50/08* | (2020.01) |
| *B60W 50/14* | (2020.01) |
| *B60W 60/00* | (2020.01) |
| *G08G 1/16* | (2006.01) |

(52) U.S. Cl.
CPC .......... *B60W 50/085* (2013.01); *B60W 50/14* (2013.01); *B60W 60/0013* (2020.02); *G08G 1/16* (2013.01); *B60W 2050/146* (2013.01); *B60W 2540/30* (2013.01); *B60W 2710/20* (2013.01); *B60W 2710/223* (2013.01)

(58) Field of Classification Search
CPC .............. B60W 50/085; B60W 50/14; B60W 60/0013; B60W 2050/146; B60W 2540/30; B60W 2710/20; B60W 2710/223; G08G 1/16
See application file for complete search history.

(56) References Cited

U.S. PATENT DOCUMENTS

| | | | |
|---|---|---|---|
| 11,691,632 B1 * | 7/2023 | Chen | B60L 1/00 701/22 |
| 2014/0309866 A1 | 10/2014 | Ricci | |
| 2015/0112512 A1 * | 4/2015 | Fan | B60G 17/02 701/1 |
| 2015/0217780 A1 | 8/2015 | Chen et al. | |
| 2016/0055750 A1 * | 2/2016 | Linder | G08G 1/16 340/905 |
| 2019/0291719 A1 * | 9/2019 | Tiziani | B60K 35/22 |
| 2019/0329672 A1 | 10/2019 | Brown et al. | |
| 2021/0185095 A1 | 6/2021 | Harel et al. | |
| 2021/0294944 A1 | 9/2021 | Nassar et al. | |

(Continued)

*Primary Examiner* — Jason Holloway
*Assistant Examiner* — Blake A Wood
(74) *Attorney, Agent, or Firm* — ALSTON & BIRD LLP (57) ABSTRACT

A method, apparatus, and computer program product are therefore provided for emulating vehicle features of a first vehicle in a second vehicle having different features. Methods may include: receiving an indication of a user operating an unfamiliar vehicle; determining vehicle features familiar to the user; and providing emulation of one or more features of the vehicle features familiar to the user in the unfamiliar vehicle. According to some embodiments, the vehicle features familiar to the user are determined based on one or more vehicles familiar to the user. According to certain embodiments, vehicle features familiar to the user include one or more of vehicle size, vehicle performance, or vehicle autonomy level.

19 Claims, 5 Drawing Sheets

(56) References Cited

U.S. PATENT DOCUMENTS

| | | | |
|---|---|---|---|
| 2022/0041176 A1* | 2/2022 | Balachandran | B60W 10/04 |
| 2022/0204011 A1* | 6/2022 | Sugimoto | B60R 16/037 |
| 2023/0077434 A1* | 3/2023 | Penilla | G08G 1/205 |
| | | | 709/217 |
| 2023/0161611 A1* | 5/2023 | Damiani | B60K 35/10 |
| | | | 715/708 |

* cited by examiner

METHOD, APPARATUS AND COMPUTER PROGRAM PRODUCT FOR VEHICLE FEATURE EMULATION

TECHNOLOGICAL FIELD

An example embodiment of the present invention relates generally to the emulation of vehicle features and attributes, and more particularly, for emulating vehicle features of a first vehicle in a second vehicle having different features.

BACKGROUND

Vehicles have advanced significantly in recent years with the advent of new technologies, such as driver assistance technology that can at least semi-autonomously control the vehicle. Further, infotainment systems within cars are technologically advanced and provide features well beyond the radio of vehicles from years ago. In addition to technical advances, differences between vehicles can be physical dimensions of a vehicle. Small vehicles developed for city use or primarily for commuting may have a small overall size to promote fuel efficiency and ease of parking. Large vehicles have been developed for use with certain types of professions (e.g., work trucks) and for carrying large loads or quantities of people. These larger vehicles can vary in size but can be several times larger than the smallest of road going vehicles. Further, commercial trucks can vary in size from cargo vans to large, articulated trailered vehicles.

The wide array of vehicles requires a steep learning curve when a driver transitions from one vehicle to a next vehicle of different features or proportions. These transitions can be uncomfortable for a driver and can lead to a lack of confidence in operation of the vehicle due to a lack of familiarity.

BRIEF SUMMARY

Example embodiments therefore provided for emulating vehicle features of a first vehicle in a second vehicle having different features. Embodiments provide an apparatus including at least one processor and at least one non-transitory memory including computer program code instructions, the computer program code instructions may be configured to, when executed, cause the apparatus to at least: receive an indication of a user operating an unfamiliar vehicle; determine vehicle features familiar to the user; and provide emulation of one or more features of the vehicle features familiar to the user in the unfamiliar vehicle. According to some embodiments, the vehicle features familiar to the user are determined based on one or more vehicles familiar to the user. According to certain embodiments, vehicle features familiar to the user include one or more of vehicle size, vehicle performance, or vehicle autonomy level.

According to certain embodiments, the vehicle features familiar to the user include vehicle size, where causing the apparatus to provide emulation of the one or more features of the vehicle features familiar to the user in the unfamiliar vehicle includes causing the apparatus to change a distance at which proximity sensor alerts are generated. According to some embodiments, the vehicle features familiar to the user include vehicle performance, where causing the apparatus to provide emulation of the one or more features of the vehicle features familiar to the user in the unfamiliar vehicle include causing the apparatus to alter one or more performance characteristics of the unfamiliar vehicle to emulate performance characteristics familiar to the user. The one or more performance characteristics include, in some embodiments, at least one of: acceleration rate, deceleration rate, steering ratio, or suspension firmness.

According to some embodiments, the vehicle features familiar to the user include vehicle autonomy level, where causing the apparatus to provide emulation of the one or more features of the vehicle features familiar to the user in the unfamiliar vehicle includes causing the apparatus to provide a warning to the user of autonomous control features present in the unfamiliar vehicle determined to be unfamiliar to the user. Causing the apparatus of some embodiments to determine vehicle features familiar to the user includes causing the apparatus to: determine, from a vehicle familiarity index, vehicle features familiar to the user, where causing the apparatus to provide emulation of the one or more features of the vehicle features familiar to the user in the unfamiliar vehicle includes causing the apparatus to provide emulation of one or more features of the vehicle features familiar to the user based on a predefined degree of difference from features of the unfamiliar vehicle.

Embodiments provided herein include a computer program product including at least one non-transitory computer-readable storage medium having computer-executable program code instructions stored therein, the computer-executable program code instructions including program code instructions to: receive an indication of a user operating an unfamiliar vehicle; determine vehicle features familiar to the user; and provide emulation of one or more features of the vehicle features familiar to the user in the unfamiliar vehicle. According to some embodiments, the vehicle features familiar to the user are determined based on one or more vehicles familiar to the user. According to certain embodiments, vehicle features familiar to the user include one or more of vehicle size, vehicle performance, or vehicle autonomy level.

According to certain embodiments, the vehicle features familiar to the user include vehicle size, where the program code instructions to provide emulation of the one or more features of the vehicle features familiar to the user in the unfamiliar vehicle include program code instructions to change a distance at which proximity sensor alerts are generated. According to some embodiments, the vehicle features familiar to the user include vehicle performance, where the program code instructions to provide emulation of the one or more features of the vehicle features familiar to the user in the unfamiliar vehicle include program code instructions to alter one or more performance characteristics of the unfamiliar vehicle to emulate performance characteristics familiar to the user. The one or more performance characteristics include, in some embodiments, at least one of: acceleration rate, deceleration rate, steering ratio, or suspension firmness.

According to some embodiments, the vehicle features familiar to the user include vehicle autonomy level, where the program code instructions to provide emulation of the one or more features of the vehicle features familiar to the user in the unfamiliar vehicle include program code instructions to provide a warning to the user of autonomous control features present in the unfamiliar vehicle determined to be unfamiliar to the user. The program code instructions of some embodiments to determine vehicle features familiar to the user include program code instructions to: determine, from a vehicle familiarity index, vehicle features familiar to the user, where the program code instructions to provide emulation of the one or more features of the vehicle features familiar to the user in the unfamiliar vehicle include program code instructions to provide emulation of one or more features of the vehicle features familiar to the user based on a predefined degree of difference from features of the unfamiliar vehicle.

Embodiments provided herein include a method including: receiving an indication of a user operating an unfamiliar vehicle; determining vehicle features familiar to the user; and providing emulation of one or more features of the vehicle features familiar to the user in the unfamiliar vehicle. According to some embodiments, the vehicle features familiar to the user are determined based on one or more vehicles familiar to the user. According to certain embodiments, vehicle features familiar to the user include one or more of vehicle size, vehicle performance, or vehicle autonomy level.

According to certain embodiments, the vehicle features familiar to the user include vehicle size, where providing emulation of the one or more features of the vehicle features familiar to the user in the unfamiliar vehicle includes changing a distance at which proximity sensor alerts are generated. According to some embodiments, the vehicle features familiar to the user include vehicle performance, where providing emulation of the one or more features of the vehicle features familiar to the user in the unfamiliar vehicle includes altering one or more performance characteristics of the unfamiliar vehicle to emulate performance characteristics familiar to the user. The one or more performance characteristics include, in some embodiments, at least one of: acceleration rate, deceleration rate, steering ratio, or suspension firmness.

According to some embodiments, the vehicle features familiar to the user include vehicle autonomy level, where providing emulation of the one or more features of the vehicle features familiar to the user in the unfamiliar vehicle includes providing a warning to the user of autonomous control features present in the unfamiliar vehicle determined to be unfamiliar to the user. According to some embodiments, determining vehicle features familiar to the user includes: determining, from a vehicle familiarity index, vehicle features familiar to the user, where providing emulation of the one or more features of the vehicle features familiar to the user in the unfamiliar vehicle includes providing emulation of one or more features of the vehicle features familiar to the user based on a predefined degree of difference from features of the unfamiliar vehicle.

Embodiments provided herein include an apparatus including: means for receiving an indication of a user operating an unfamiliar vehicle; means for determining vehicle features familiar to the user; and means for providing emulation of one or more features of the vehicle features familiar to the user in the unfamiliar vehicle. According to some embodiments, the vehicle features familiar to the user are determined based on one or more vehicles familiar to the user. According to certain embodiments, vehicle features familiar to the user include one or more of vehicle size, vehicle performance, or vehicle autonomy level.

According to certain embodiments, the vehicle features familiar to the user include vehicle size, where the means for providing emulation of the one or more features of the vehicle features familiar to the user in the unfamiliar vehicle include means for changing a distance at which proximity sensor alerts are generated. According to some embodiments, the vehicle features familiar to the user include vehicle performance, where the means for providing emulation of the one or more features of the vehicle features familiar to the user in the unfamiliar vehicle include means for altering one or more performance characteristics of the unfamiliar vehicle to emulate performance characteristics familiar to the user. The one or more performance characteristics include, in some embodiments, at least one of: acceleration rate, deceleration rate, steering ratio, or suspension firmness.

According to some embodiments, the vehicle features familiar to the user include vehicle autonomy level, where the means for providing emulation of the one or more features of the vehicle features familiar to the user in the unfamiliar vehicle include means for providing a warning to the user of autonomous control features present in the unfamiliar vehicle determined to be unfamiliar to the user. According to some embodiments, the means for determining vehicle features familiar to the user includes: means for determining, from a vehicle familiarity index, vehicle features familiar to the user, where the means for providing emulation of the one or more features of the vehicle features familiar to the user in the unfamiliar vehicle include means for providing emulation of one or more features of the vehicle features familiar to the user based on a predefined degree of difference from features of the unfamiliar vehicle.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present disclosure for emulating vehicle features of a first vehicle in a second vehicle having different features. Users that transition from one vehicle to another are often confounded by differences between the vehicles. Such transitions can occur in a variety of situations, such as when a person rents a vehicle with which they are unfamiliar. Further, vehicle-sharing services may employ a fleet of different types of vehicles, where a user may find themselves in a different type of vehicle each time they require one. Additionally, commercial vehicle drivers may transition between different types and different sizes of vehicles depending upon the job and what vehicles are available. Inefficiencies exist when a user needs to learn a new type of vehicle and become familiar with features of the new vehicle.

The term familiar, as described herein, applies to when a user has achieved a predetermined level of comfort and understanding of features of a vehicle. A user being familiar with a vehicle can be determined based on a number of hours spent operating the vehicle, a distance driven in the vehicle, or a combination thereof. A user being unfamiliar with a vehicle includes where a user has not spent a significant amount of time in that vehicle or has not driven the vehicle a significant amount of miles. For example, a vehicle may be unfamiliar to a user when the user has not operated the vehicle for more than ten hours, and/or not driven the vehicle for more than 250 miles. The specific values established for familiarity may change, and may differ based on how distinct one vehicle is from another. For example, if two vehicles are relatively similar (e.g., same size, performance metrics within 25%, etc.) it may only require two hours or fifty miles for a user to gain familiarity with that vehicle. Thus, familiarity, while a relative term, reflects a comfort and understanding of a vehicle. Familiarity can optionally include a binary distinction where a vehicle is determined to be unfamiliar to a user when the user has not operated that specific vehicle. For example, a mobile device of a user may not recognize a new vehicle, or the new vehicle itself may not recognize an identity of the user. In either case, the new vehicle is unfamiliar to a user.

Becoming familiar with a new vehicle can also increase a cognitive load on a driver by requiring the driver to understand dimensions of a new vehicle, sounds of a new vehicle, and performance features of a new vehicle. Embodiments described herein emulate features of a vehicle that a user is familiar with in a vehicle with which the user is not familiar. In this way, embodiments lower the cognitive load on a user and enable a user to become familiar with and comfortable with operation of a new vehicle in a short amount of time. Embodiments described herein are configured to emulate various features of a vehicle that people become familiar with. For example, vehicle size, vehicle performance, vehicle interactive features, etc. Further, embodiments are configured to learn vehicle types with which a user is familiar in order to appropriately emulate vehicle features that a user is familiar with.

A method, apparatus, and computer program product of the present disclosure provides vehicle attribute and feature emulation from a vehicle or vehicles familiar to a user in a vehicle with which the user is unfamiliar. Embodiments provide a driver/operator assistance in obtaining a better sense for dimensions of a new vehicle by adapting sensor responsive ness based on known knowledge of a specific user. Embodiments compare dimensions of a vehicle familiar to the user with dimensions of a vehicle new to the user, and based on that comparison, activates or does not activate emulation or dimensional difference assistance.

Embodiments described herein employ machine learning to compute a familiarity index for a user given a new vehicle or sets of vehicles (e.g., available vehicles), based on a user's historical vehicle operation information and vehicle interaction. The familiarity index can optionally be used to select a vehicle of available vehicles for a particular user. Using thresholds on the familiarity index, embodiments may implement various features for emulation, including: transposing operational features from a familiar vehicle to a new vehicle; adjusting a new vehicle's early warning/proximity detection based on a user's familiarity with the new vehicle; and employing emulation for a fixed time or a fixed distance. Embodiments can retrieve vehicle characteristics, features, and attributes from a database (e.g., in the cloud, a manufacturer database, or the like) and output the relevant different characteristics, features, and attributes that are to be simulated/emulated. Embodiments may employ an augmented reality user interface to help demonstrate to a user differences between a new vehicle and vehicles with which the user is familiar.

The term "user" as described herein can be in reference to a driver or occupant of a vehicle. As autonomous vehicle functionality becomes more common, the control of a vehicle may be manual (without any autonomy), semi-autonomous (involving some autonomous features such as brake assist, cruise control, etc.), or fully-autonomous (requiring little to no driver input). Thus, a "driver" in the conventional sense of the term may be only an occupant or user in a fully-autonomous vehicle. Thus, the user, as described herein, is the primary occupant/driver/operator of a vehicle regardless of the level of autonomy. Further, embodiments described herein can adapt autonomy levels based on a familiarity of a user to a level with which they are comfortable in the same manner as the vehicle features described above.

Figure 1:
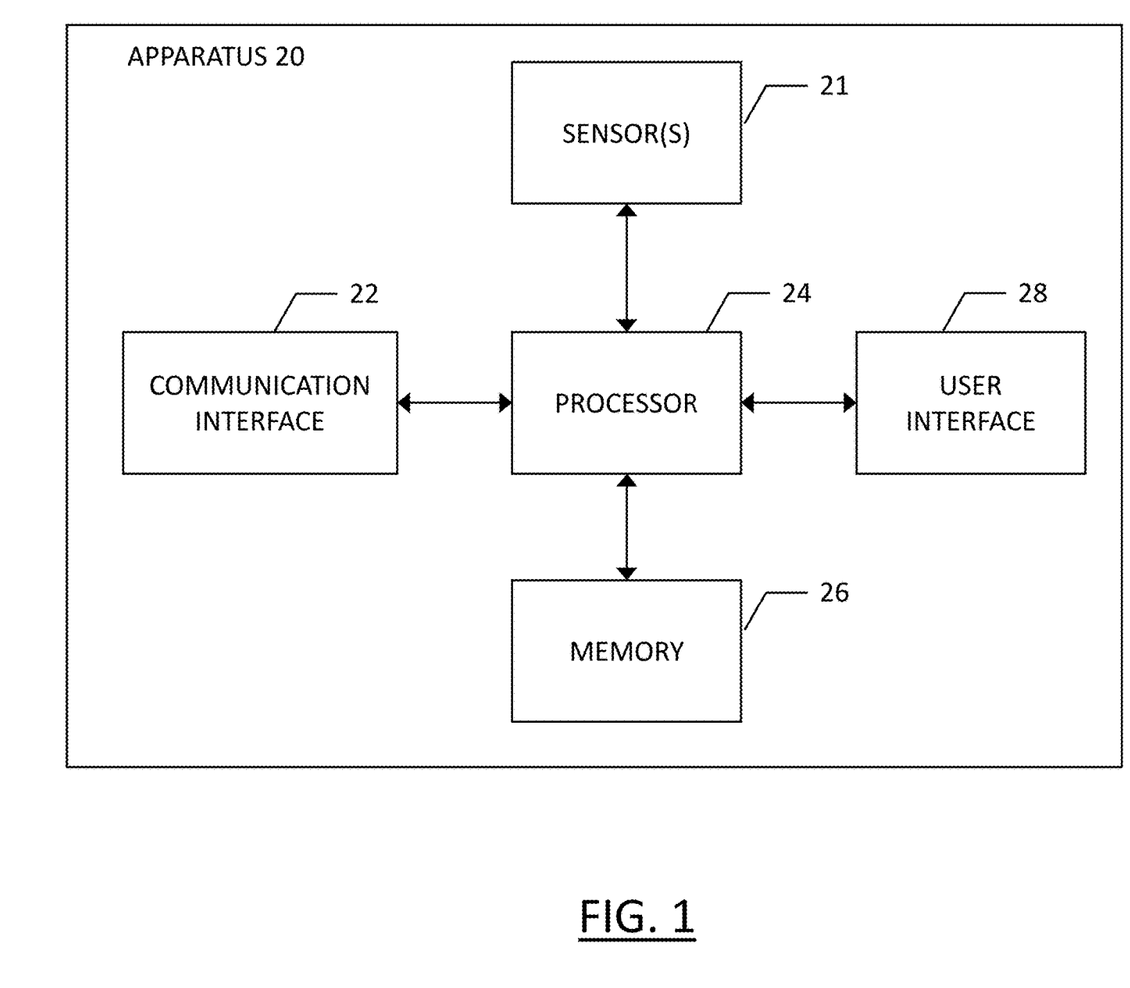
FIG. 1 is a block diagram of an apparatus for emulating vehicle features of a first vehicle in a second vehicle having different features according to an example embodiment of the present disclosure.

FIG. 1 is a schematic diagram of an example apparatus configured for performing any of the operations described herein. Apparatus 20 is an example embodiment that may be embodied by or associated with any of a variety of computing devices that include or are otherwise associated with a vehicle. For example, the computing device may be an infotainment system of a vehicle, a navigation system, an autonomous vehicle controller, a vehicle control module, or the like. According to some embodiments, the apparatus 20 can include a computing device that provides instructions or commands to a vehicle control module or other vehicle controller, where the apparatus is a mobile device carried by a user, such as a mobile terminal, such as a personal digital assistant (PDA), mobile telephone, smart phone, personal navigation device, smart watch, tablet computer, or any combination of the aforementioned and other types of communications systems. In this manner, embodiments can be implemented on purely in-vehicle systems, through mobile devices commanding in-vehicle systems, or a combination thereof.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory 26 and a user interface 28. In some embodiments, the processor (and/or co-processors or any other processing circuitry assisting or otherwise associated with the processor) may be in communication with the memory device via a bus for passing information among components of the apparatus. The memory 26 may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory 26 may be configured to store information, data, content, applications, instructions, or the like for enabling the apparatus to carry out various functions in accordance with an example embodiment of the present disclosure. For example, the memory 26 could be configured to buffer input data for processing by the processor. Additionally or alternatively, the memory could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, a plurality of spatially arranged speakers, headphones, ear bud speakers, physical buttons, and/or other input/output mechanisms. The user interface 28 may be incorporated into a vehicle, such as a dedicated navigation system display/audio system or a device that can attach or associate with the vehicle physically and/or via a wireless communication link. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory 26, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE) and/or the fifth generation technology standard for broadband cellular networks, 5G. In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

The apparatus 20 of an example embodiment can be embodied by various vehicle controllers, such as an engine control module (ECM), a transmission control module (TCM), an autonomous vehicle controller, or the like. These controllers can be separate or in a single module; however, these controllers function in concert to enable vehicle functionality. As such, the apparatus 20 can be interpreted as a general controller performing each of these functions to enable vehicle functionality accordingly.

Figure 2:
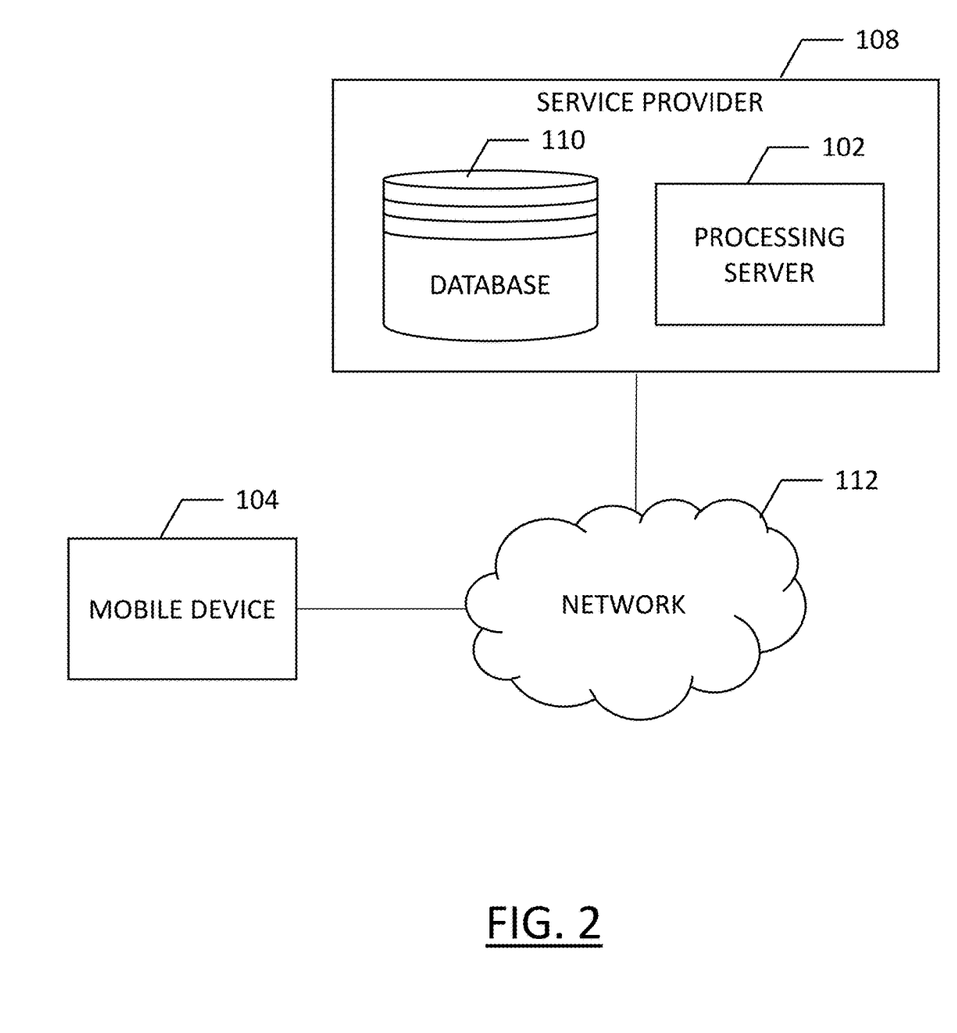
FIG. 2 is a block diagram of a system for emulating vehicle features of a first vehicle in a second vehicle having different features according to an example embodiment of the present disclosure.

FIG. 2 illustrates a communication diagram of an example embodiment of a system for implementing example embodiments described herein. The illustrated embodiment of FIG. 2 includes a mobile device 104, which may be, for example, the apparatus 20 of FIG. 1, such as a vehicle controller, mobile phone, the vehicle itself, or the like, and a service provider 108 which may be a cloud service. Each of the mobile device 104 and service provider 108 may be in communication with each other as illustrated in FIG. 2 via a network 112, which may be any form of wireless or partially wireless network as will be described further below. Additional, different, or fewer components may be provided. For example, many mobile devices 104 may connect with the network 112. The service provider 108 may be cloud-based services and/or may operate via a hosting server that receives, processes, and provides data to other elements of the system.

The service provider 108 may include a processing server 102 and a database 110 that may include vehicle-specific information pertaining to vehicles that travel within a road network. The vehicle data can include dimensions, performance characteristics, technological features, infotainment features, an autonomous control features among other vehicle data. This data can be provided by manufacturers, or collected by communication with vehicles as they enroll or participate in a service for vehicle feature emulation. Vehicle identification numbers (VINs) can provide valuable information relating to a vehicle. The VIN can readily identify a vehicle manufacturer, year of manufacture, a body style, engine size and type, model, etc. A portion of each VIN is specific to an individual vehicle. The equipment of a vehicle can be identified through this portion of the VIN, but may only be available from a manufacturer. Manufacturers may provide this information to the database 110, and optionally, such vehicle equipment may be provided to the database when a vehicle connects to the service provider 108 via the network 112.

The processing server 102, which can be embodied by, for example, the apparatus 20 of FIG. 1 can maintain and provide access to the database 110. For example, the processing server 102 can maintain, using the database 110, tables or indices of vehicle features with which a user is familiar. Further, the processing server 102 can be used to process vehicle features from a vehicle that is new to a user and to establish what features may be unfamiliar to a user. The processing server 102 facilitates services provided by the service provider 108 that uses the data stored in the database 110 to recognize what vehicle features are familiar to a user, and what features may be new to a user.

In one embodiment, as noted above, the end user device or mobile device 104 can be embodied by the apparatus 20 of FIG. 1 and can include an in-vehicle system, such as an ADAS (advanced driver assistance system), a personal navigation device (PND), a portable navigation device, a cellular telephone, a smart phone, a personal digital assistant (PDA), a watch, a computer, and/or other device that can perform navigation and vehicle control related functions, such as digital routing, map display, and vehicle control. An end user can use the mobile device 104 for navigation and map functions such as guidance and map display, for example, and for determination of one or more personalized routes or route segments based on one or more calculated and recorded routes, according to some example embodiments. An end user can further use the mobile device 104 to facilitate control of the vehicle and to provide an interface with the vehicle with respect to vehicle features.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Vehicle users generally become very familiar with a vehicle they regularly use. Vehicle dimensions vary greatly across different vehicle classes and types, and vehicle features differ considerably among different manufacturers and even among different trim levels from a single manufacturer. When a user transitions from one vehicle to another vehicle, they may be disoriented by different aspects of the vehicle. These aspects are generally broken down into the categories of: vehicle dimensions/size; vehicle performance; vehicle features; and vehicle autonomy.

Vehicle dimensions or size relate generally to a length, width, and height of a vehicle. Further, vehicle dimensions can include a vehicle weight as heavier vehicles perform differently than lighter vehicles; however, weight can also be emulated in the vehicle performance category. Vehicle performance includes acceleration, deceleration, turning radius, steering ratio, accelerator pedal sensitivity, brake pedal sensitivity, performance in inclement weather, performance on different road or off-road surfaces, etc. Vehicle features can include elements such as infotainment (e.g., displays, applications, subscriptions), notifications (e.g., sounds and alerts), and creature comforts within a vehicle. Vehicle autonomy can include a degree of autonomy with which the vehicle is capable (e.g., semi-autonomous or fully autonomous), autonomous features (e.g., braking, accelerating, hands-free steering, cruise control, self-parking, etc.), or the like.

Vehicle users may be identified through a variety of manners. For example, a user may be identified based on a mobile device they carry that includes a user identification. Such a user identification may identify the user and the vehicles with which they are familiar, along with a degree of familiarity of certain vehicles. Optionally, a user may not require identification. For example, when a user gets into a new vehicle, a user interface (e.g. user interface 28) may offer an option of emulation of another vehicle, and may solicit user input as to a vehicle with which the user is comfortable. The vehicle may emulate the user-selected vehicle as described herein. However, for the machine learning features below, user identification is important to understand a user's specific vehicle familiarity.

When a user transitions between vehicles of different sizes, the size discrepancy can render a user uncomfortable, and can increase apprehension and cognitive load on a user. Thus, embodiments described herein provide the ability for a vehicle to emulate a vehicle of a different size. To do so, the sensors of a vehicle may be recalibrated to simulate a vehicle envelope of a different size. For example, a small vehicle 202 shown in FIG. 3 has a forward-facing proximity sensor used to aid parking and estimating a distance between the front of the small vehicle 202 and an object in front of the small vehicle. This proximity sensor may initially trigger at a distance of two feet, which may be about 20% of a length of a small car. This initial trigger range 204 is shown in the arc about the front of the small vehicle 202. This initial trigger distance may be sufficient and viewed as conventional for a driver of the small vehicle. Upon entering a larger vehicle 212, the initial trigger range 214 may also be at a distance of about two feet from a front of the larger vehicle. While this distance is equal to that of the initial trigger distance of the small vehicle, such a distance may only be about 10% of a length of a larger vehicle. Such a change may make a driver transitioning from a smaller vehicle to a larger vehicle uncomfortable with the initial trigger distance given the size of the larger vehicle.

Figure 3:
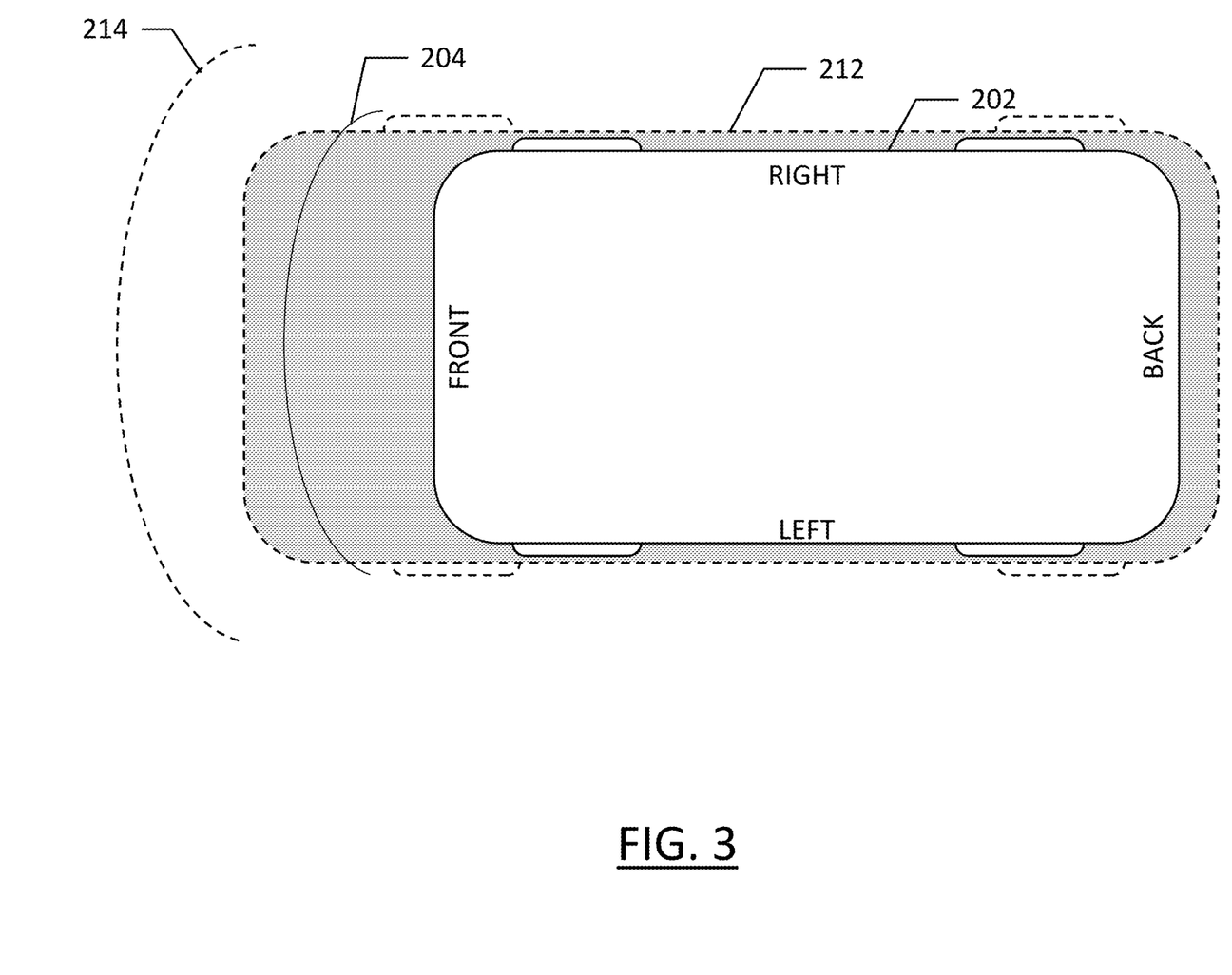
FIG. 3 illustrates a first vehicle relative to the size of a second vehicle according to an example embodiment of the present disclosure.

Embodiments described herein emulate vehicle dimensions through adjusting features related to dimensions of a vehicle to make a driver more familiar with an unfamiliar vehicle. In the above described embodiment, the initial trigger range 214 of the larger vehicle can be increased to be 20% of the length of the larger vehicle, to mimic the trigger range proportion of the smaller vehicle. This change can help a driver to become familiar with the larger dimensions of the larger vehicle and to reduce the cognitive load on the driver of all of the differences they experience in transitioning from the smaller vehicle to the larger vehicle.

The initial trigger range shown in FIG. 3 and described above represents where a proximity sensor initially begins warning a user of proximity to an object. Often these proximity warnings have different levels of proximity alerts. For example, when an object is first detected at the initial trigger range, an initial caution may be presented, where a detected object may cause a green or yellow alert and a first pattern of audible alerts may be sounded. When the object becomes closer to the vehicle, a moderate caution may be triggered, where the detected object is closer but yet there is still room to maneuver. This moderate caution may cause a yellow or orange alert and a second pattern of audible alerts to be sounded. A high caution when a vehicle is very close to an object may include a red alert and a third pattern of audible alerts. The pattern of audible alerts may be an increase in frequency as the vehicle approaches an object, signifying contact or near contact with a constant tone. There may exist more or fewer than three levels of caution; however, this is merely an example.

The levels of caution and the distances at which they are triggered can be adapted between vehicles as described above with respect to the initial trigger range of FIG. 3. Larger vehicles may be adapted to trigger caution levels at higher distances reflecting a respective size of the vehicle. Proximity alerts for the sides and rear of a vehicle may be adjusted similarly to help a user become familiar with the larger vehicle. Vehicle size emulation can also be used when transitioning from a larger vehicle to a smaller vehicle in much the same way. The goal is to emulate vehicle size-related features of a vehicle with which a user is familiar in a vehicle of a different size.

According to some embodiments, there may be a threshold difference in dimensions between vehicles before feature emulation is provided. For example, if a first vehicle with which a user is familiar is only a foot longer (or shorter) than a second vehicle, new to the user, and only a few inches wider (or narrower) than the second vehicle, then dimensional feature emulation may not be implemented as the vehicles are of sufficiently similar size.

Embodiments described herein emulate vehicle performance characteristics between vehicles to assist a user in becoming familiar with a new vehicle. Performance characteristics between vehicles vary widely, particularly based on vehicle types. These performance characteristic differences can make users uncomfortable with operation of a new vehicle and more prone to mistakes in operation if they are nervous or unfamiliar. For example, vehicle acceleration can range from a zero-to-sixty miles per hour or "0-60 mph time" of around two seconds for the fastest of road going vehicles, to over ten seconds for some fuel-economy focused vehicles and larger vehicles. A drastic change in vehicle performance (e.g., 0-60 mph time change of greater than one or two seconds) can significantly affect driving habits of a vehicle. Thus, embodiments described herein provide emulation of vehicle performance characteristics between vehicles.

According to an example embodiment, a user that is familiar with a vehicle having an 8-second 0-60 mph time transitioning to a vehicle with a sub-5-second 0-60 mph time may benefit from emulation of the vehicle they were familiar with in the new vehicle. As such, the new vehicle may be governed to a 7-second 0-60 mph time. As described further below, this vehicle performance emulation can be configured to decay or sunset after a certain period of time or amount of user driving of the vehicle. Further, the performance emulation and all feature emulation can gradually transition from the emulated vehicle features to those of the new vehicle such that the full performance ability of a vehicle can be realized as a user becomes more familiar with a new vehicle.

Beyond an acceleration time emulation, other performance features of a vehicle can be emulated to help a user become more familiar with a new vehicle. Such performance features include pedal feel, braking, steering/turning, suspension, etc. The pedal feel between different vehicles can be distinct and can be challenging to users unfamiliar with a vehicle. For example, a firm brake pedal that has a operational travel range of two inches from initial braking to full braking may be uncomfortable for a user that is coming from a vehicle with a brake pedal operational travel range of six inches. Such a transition can result in a user abruptly braking due to their lack of feel or touch on the new brake pedal of the new car. While hydraulic braking systems directly, mechanically coupled from a master cylinder to a brake pedal may be limited in emulation abilities, brake-by-wire electronically assisted brakes and braking systems of electric vehicles provide opportunities to provide brake pedal feel emulation. In such an example, a user coming from a vehicle with a brake pedal operational travel of six inches may have a new vehicle with typically only two inches of brake pedal operational travel adjusted to around four or five inches of brake pedal operational travel.

Figure 4:
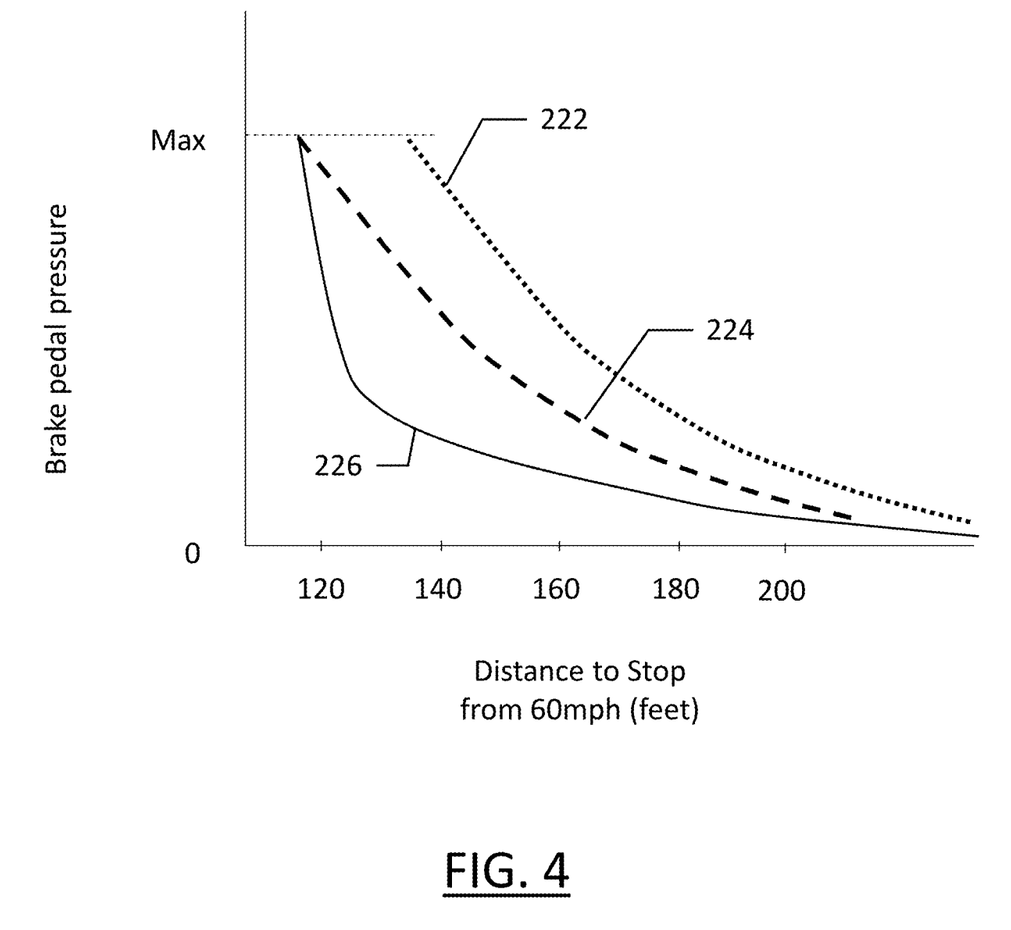
FIG. 4 illustrates an example embodiment of braking ability emulation between a familiar vehicle and a new vehicle according to an example embodiment of the present disclosure.

Beyond brake pedal feel, the braking ability itself of a vehicle can be emulated from a vehicle with which a user is familiar to a new vehicle. Braking is a critical feature for safety, such that emulation of braking ability is not intended to limit braking ability of a vehicle, but instead to emulate a braking curve of a vehicle as pressure is applied to a brake pedal. At maximum brake pedal travel, regardless of braking ability emulation, maximum braking is applied. FIG. 4 illustrates an example embodiment of braking ability emulation between a familiar vehicle and a new vehicle. As shown, a familiar vehicle braking ability curve 222 is shown, where the stopping distance from 60 mph is about 140 feet. The new vehicle braking ability curve 226 is capable of stopping from 60 mph in about 120 feet. The emulated braking ability curve 224 retains the new vehicle's stopping distance of about 120 feet, but the curvature is more flat, resembling that of the familiar vehicle braking ability curve 222 while retaining the braking capability of the new vehicle.

The steering and turning ability of a vehicle may optionally be emulated to make a user more comfortable with a new vehicle. Steering ratio and turning radius conventionally was dictated by mechanical components and not adjustable. However, recent developments have implemented variable-ratio steering which enables some degree of electronic control of turning ability and steering. Steering ratio, when linear, is established through "lock-to-lock" of the steering wheel, from the sharpest left turn to the sharpest right turn of a vehicle. This steering ratio can be dynamic in some cases, where the steering ratio is not linear, and steering ratio changes with speed. Embodiments described herein can emulate steering ratio from a vehicle that a user is familiar with to a new vehicle. Further, as turning radius of vehicles differs, the steering ratio emulated may be established, in part, based on the turning radius of the new vehicle. The turning radius of a vehicle will not be limited through emulation; however, the steering feel can be emulated between vehicles, particularly in the initial off-center steering of the wheel, or the first half- to full-turn of the steering wheel in either direction off-center.

Embodiments described herein can emulate suspension characteristics between vehicles. Suspension feel can differ between vehicles such as a firm suspension or a softer suspension. Further, suspension can be adjustable between firm and soft, and can by dynamically adjusted while driving. Embodiments described herein can emulate the suspension feel and dynamic suspension feel of a vehicle with which a user is familiar on a new vehicle.

Beyond vehicle performance characteristics of a vehicle that may be emulated are vehicle features. Vehicle features can include elements of a vehicle that a user experiences within a vehicle, such as vehicle infotainment (e.g., displays, applications, subscriptions), notifications (e.g., sounds and alerts), and creature comforts within a vehicle. The infotainment system of a vehicle, which can include a vehicle navigation system, entertainment system, and information system, can provide information and entertainment to a user and occupants of a vehicle. Emulating an infotainment system from one vehicle to another may be limited by capabilities and by compatibility. However, certain aspects of infotainment systems can be emulated such as preferences for navigation, preferences for radio stations or other audio (e.g., music apps, podcasts, etc.), climate control settings, and subscriptions to various services. The layout of a user interface of an infotainment system can further be emulated between vehicles such that a user is immediately familiar with the controls and displays of a new vehicle.

Beyond the infotainment and climate controls of a vehicle, embodiments provided herein emulate notifications and how information is conveyed to a user of a vehicle. For example, chimes within a vehicle can remind a user of an open door, a back-seat reminder, lights left on, proximity sensing (e.g., parking), blind-spot warnings, or the like. These chimes and sounds can differ between vehicles. Embodiments described herein can emulate these sounds from a vehicle with which the user is familiar on a vehicle with which a user is unfamiliar. This can improve the user satisfaction and experience through making them comfortable and reducing cognitive load by having sounds that a user understands intuitively.

Embodiments described herein optionally provide vehicle autonomy emulation for a user between a vehicle with which they are familiar and a new vehicle. Vehicles on the road differ greatly between autonomous capabilities from a complete lack of autonomy to fully-autonomous vehicles. Users transitioning from a vehicle with a first level of autonomy to a second, new level of autonomy may be uncomfortable with the autonomous features or lack thereof. This transition can function in both increasing autonomy and decreasing autonomy.

For example, a user that has become accustomed to certain autonomous features (e.g., self parking, adaptive cruise control, etc.) may have difficulty adjusting to a lack of such features in a new vehicle. As such, a new vehicle may emulate such features to the best of that vehicle's abilities. While a new vehicle may not have the same autonomous capabilities, the new vehicle can provide additional warnings and notifications that a user familiar with the vehicle may not receive. For example, adaptive cruise control provides acceleration and braking based on a distance to a vehicle ahead. Conventional cruise control does not provide braking, and is not aware of vehicles ahead. A vehicle that is new to a user that lacks adaptive cruise control when a user is used to adaptive cruise control may provide a warning to the user upon activation of cruise control, to remind the user that manual braking is required. Similar warnings may be issued where a user is accustomed to autonomous control, where such control is not available. When parking, a user may be alerted to the need to steer and brake to properly park. This warning is not conventionally necessary; however, when emulating features from a fully-autonomous vehicle, such warnings can help avoid confusion. Similarly, a user transitioning from a vehicle that has autonomous steering may be warned to keep their hands on the steering wheel when it is detected that a hand is not present.

Users transitioning from a lower degree of autonomous control to a vehicle with a higher degree of autonomy may be apprehensive about ceding control of a vehicle to the vehicle itself. Embodiments described herein can emulate a lower degree of autonomy while also providing indications to a user of the availability of the higher degree of autonomy. For example, with reference again to cruise control: if a user is familiar with conventional cruise control, and a new vehicle has adaptive cruise control, an alert may be provided to a user that manual braking is unnecessary during adaptive cruise control. Optionally, a user may be presented with an option to proceed with conventional cruise control or to use the adaptive cruise control. Further, users new to adaptive cruise control may be more comfortable with more conservative adaptive cruise control settings (e.g., earlier braking, slower acceleration, etc.) until they become comfortable with adaptive cruise control. Similar emulation may be employed for other autonomous control features of a vehicle to raise the level of familiarity of a user with a vehicle as they adjust to a new vehicle.

In addition to emulation of vehicle size, performance, features, and autonomy, embodiments described herein can emulate settings from a vehicle with which a user is familiar on a new vehicle. Settings such as radio volume levels, climate control settings, navigation settings (e.g., avoid tolls, home location, work location, route preferences, etc.), seat position, display preferences (e.g., fuel remaining, oil life, etc.). These features may be readily emulated between vehicles having similar capabilities.

Emulation aspects of one vehicle to another can be employed as a temporary solution to user comfort and familiarity. However, in some cases, the emulation may be persistent. For example, if a user is renting a vehicle for a day or two, it may be undesirable for them to become too familiar with a new vehicle. As such, emulation of a vehicle with which they are familiar may be persistent through their rental of the new vehicle. Similarly, if a user regularly uses different vehicles in a fleet (e.g., shared vehicle services), emulation may be performed on each vehicle that the user enters based on vehicle aspects with which they are most comfortable and familiar. However, when a user is transitioning to a new vehicle for a prolonged period of time, it may be desirable for the emulation of an old vehicle to be temporally decayed to enable the user to enjoy features that may not have been present in their old vehicle, and to reduce warnings or alerts to a user as they become more familiar with distinctions between their old vehicle and a new vehicle.

Emulation of features from a familiar vehicle to a new vehicle can be reduced over time or ended altogether based on a user becoming familiar with the new vehicle. Transition from emulated features to features of the new vehicle can be gradual or instant. Further, the transition can be triggered by a number of different occurrences. Emulation transition or ending of emulation can occur responsive to a time period (e.g., total time or time with the user operating the new vehicle), a distance driven, a number of occurrences of a particular emulated feature (e.g., parking events, cruise control activations, etc.), or a combination thereof. Optionally, emulation can transition based on a machine learning model, where a user's behaviors in a new vehicle can be monitored, and the emulation of various aspects of a previous vehicle in the new vehicle can be individually tailored and reduced based on user familiarity with the new vehicle. The transition between emulated features and features native to the new vehicle can occur over multiple drives, and can extend over non-consecutive drives as a user may use different vehicles.

Users can operate many vehicles over time and can become familiar with various different aspects of operation of those vehicles along with their respective features. Embodiments can generate a vehicle familiarity index for a user, where features from different vehicles that the user has operated can be compiled and used to determine the appropriate level of emulation. For example, a user may drive a small vehicle, but may have driven large vehicles on many occasions. If the user enters a large vehicle, even if it is one they are not specifically familiar with, the vehicle familiarity index can provide an indication that the user has a certain number of hours or miles of operating a large vehicle of similar size, and thus dimensional emulation of the new large vehicle may not be necessary. Similarly, if a user is very familiar with autonomous vehicle control based on their vehicle familiarity index, even if the user is transitioning from a relatively low-autonomy vehicle to a highly-autonomous vehicle, the learning curve may not be as steep and emulation may be limited based on the vehicle familiarity index. The vehicle familiarity index can include dimensions, features, autonomy level, and performance characteristics of vehicles operated by a user, such that while a user may not be familiar with a particular model, that model may have similar attributes of vehicles that the user is familiar with such that those features do not require emulation. Further, the vehicle familiarity index can identify those features of a vehicle with which a user is not familiar, such that emulation can be provided for that subset of features.

Embodiments described herein can be implemented in commercial vehicles and fleets to aid professional drivers in becoming accustomed to new vehicles and new loads. For example, a truck user may be familiar with driving a vehicle with a standard 53-foot trailer up to a conventional 34,000 pounds. The user may use the same vehicle, but the trailer may be an oversized trailer, a tandem trailer, or an overweight trailer. Embodiments described herein can be used to emulate the vehicle-trailer combination that the user was familiar with. For example, overweight and oversize trailers may require heavier braking, such that emulation may involve applying heavier braking in the vehicle than is signaled by the user, as the user is familiar with lighter, smaller trailers. Similarly, in reversing a trailer, if the user is familiar with a certain length of trailer, they may be uncomfortable with a longer trailer. The steering ratio in reverse may be emulated such that the trailer handles similarly to a shorter trailer, such as by reducing the steering ratio and making steering inputs less substantial.

Emulation of a familiar vehicle in a new vehicle may, in some cases, be required. For example, with respect to vehicle autonomy, a user moving from a fully-autonomous vehicle to a vehicle with lower autonomy may need to demonstrate that they are capable of operating the new vehicle. While emulation can be used and decayed over time as described above, a user may wish to end emulation sooner. In such an embodiment, a user may be required to pass a series of tests to end emulation. These tests may include completing specific drive cycles, or performing certain maneuvers before the emulation ends.

According to some embodiments, augmented reality may be employed for vehicle feature emulation. For example, for dimensionally different vehicles, augmented reality can provide a view that depicts the bounds of the old, familiar vehicle together with the bounds of the new vehicle. Such augmented reality can illustrate to a user how a vehicle differs from those with which they are familiar, which may lead to faster familiarization with a new vehicle.

Figure 5:
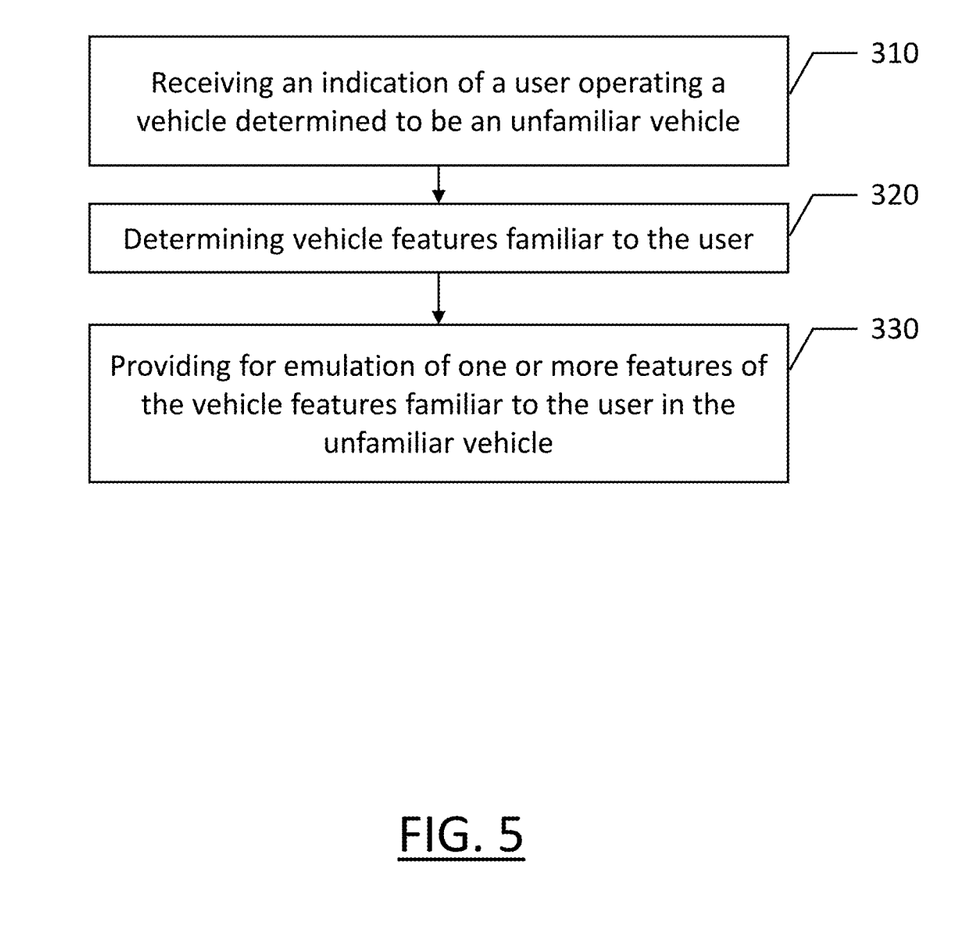
FIG. 5 illustrates a flowchart of a method for emulating vehicle features of a first vehicle in a second vehicle having different features according to an example embodiment of the present disclosure.

FIG. 5 is a flowchart illustrative of one or more methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 illustrates a method for emulating vehicle features of a first vehicle in a second vehicle having different features. As shown, an indication of a user operating a vehicle determined to be an unfamiliar vehicle is received at 310. This determination may be made, for example, based on a cumulative number of miles over which a user has operated the vehicle, or a cumulative amount of time over which the user has operated the vehicle. The familiarity may optionally include only recent familiarity, such as when a user has a cumulative number of miles or cumulative amount of time in a vehicle within the most recent three months. This familiarity can be manually identified by a user or through automatic detection, such as by a user's mobile device identifying an unfamiliar vehicle through detection of a vehicle identifier upon a user entering a vehicle. User biometric information may optionally be used, such as if a user gets into a vehicle and provides a biometric identifier (e.g., fingerprint) to a sensor, and a vehicle recognizes that the user is unfamiliar, or as a limited degree of familiarity with the vehicle type, for example. Vehicle features familiar to a user are determined at 320. This determination may be made, for example, based on a feature matrix that identifies features with which the user is familiar. A user may be familiar with more than one vehicle, such that features from more than one vehicle are considered in determining features with which the user is familiar. Each feature within such a feature matrix may include a familiarity level. For example, if a user regularly drives mid-sized sedans, albeit of different makes and models, a vehicle the size of a mid-sized sedan may be very familiar to the user. A cumulative amount of time or cumulative number of miles may be indicated for each feature to establish a level of familiarity. At 330, emulation of one or more features of the vehicle features familiar to the user are provided for in the unfamiliar vehicle. Examples of this emulation include dimensional, auditory, visual, or other features of a familiar vehicle are emulated or replicated on an unfamiliar vehicle to give the user an improved comfort level in the unfamiliar vehicle, as described in more detail above.

In an example embodiment, an apparatus for performing the methods of FIG. 5 above may include a processor (e.g., the processor 24) configured to perform some or each of the operations (310-330) described above. The processor may, for example, be configured to perform the operations (310-330) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-330 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive an indication of a user operating a vehicle determined to be an unfamiliar vehicle;
   determine vehicle features familiar to the user;
   provide emulation of one or more features of the vehicle features familiar to the user in the unfamiliar vehicle including emulation of a vehicle size familiar to the user in the unfamiliar vehicle by adjusting proximity alerts in the unfamiliar vehicle based on the vehicle size familiar to the user; and phase out the emulation of the one or more features of the vehicle features familiar to the user in the unfamiliar vehicle based on at least one of an elapsed time of the emulation or a distance traveled with the emulation.

2. The apparatus of claim 1, wherein the vehicle features familiar to the user are determined based on one or more vehicles familiar to the user.

3. The apparatus of claim 1, wherein adjusting proximity alerts in the unfamiliar vehicle based on the vehicle size familiar to the user comprises causing the apparatus to:

change a distance at which proximity sensor alerts are generated.

4. The apparatus of claim 1, wherein the vehicle features familiar to the user comprise vehicle performance, wherein causing the apparatus to provide emulation of the one or more features of the vehicle features familiar to the user in the unfamiliar vehicle comprises causing the apparatus to:

alter one or more performance characteristics of the unfamiliar vehicle to emulate performance characteristics familiar to the user.

5. The apparatus of claim 4, wherein the one or more performance characteristics comprise at least one of: acceleration rate, deceleration rate, steering ratio, or suspension firmness.

6. The apparatus of claim 1, wherein the vehicle features familiar to the user comprise vehicle autonomy level, wherein causing the apparatus to provide emulation of the one or more features of the vehicle features familiar to the user in the unfamiliar vehicle comprises causing the apparatus to:

provide a warning to the user of autonomous control features present in the unfamiliar vehicle determined to be unfamiliar to the user.

7. The apparatus of claim 1, wherein causing the apparatus to determine vehicle features familiar to the user comprises causing the apparatus to:

determine, from a vehicle familiarity index, vehicle features familiar to the user, and wherein causing the apparatus to provide emulation of the one or more features of the vehicle features familiar to the user in the unfamiliar vehicle comprises causing the apparatus to provide emulation of the one or more features of the vehicle features familiar to the user based on a predefined degree of difference from features of the unfamiliar vehicle.

8. A computer program product comprising at least one non-transitory computer-readable storage medium having computer-executable program code instructions stored therein, the computer-executable program code instructions comprising program code instructions to:

receive an indication of a user operating a vehicle determined to be an unfamiliar vehicle;

determine vehicle features familiar to the user;

provide emulation of one or more features of the vehicle features familiar to the user in the unfamiliar vehicle including emulation of a vehicle size familiar to the user in the unfamiliar vehicle by adjusting proximity alerts in the unfamiliar vehicle based on the vehicle size familiar to the user; and phase out the emulation of the one or more features of the vehicle features familiar to the user in the unfamiliar vehicle based on at least one of an elapsed time of the emulation or a distance traveled with the emulation.

9. The computer program product of claim 8, wherein the vehicle features familiar to the user are determined based on one or more vehicles familiar to the user.

10. The computer program product of claim 8, wherein the vehicle features familiar to the user comprise one or more of: vehicle size, vehicle performance, or vehicle autonomy level.

11. The computer program product of claim 8, wherein the program code instructions for adjusting proximity alerts in the unfamiliar vehicle based on the vehicle size familiar to the user comprise program code instructions to:

change a distance at which proximity sensor alerts are generated.

12. The computer program product of claim 8, wherein the vehicle features familiar to the user comprise vehicle performance, wherein the program code instructions to provide emulation of the one or more features of the vehicle features familiar to the user in the unfamiliar vehicle comprise program code instructions to:

alter one or more performance characteristics of the unfamiliar vehicle to emulate performance characteristics familiar to the user.

13. The computer program product of claim 12, wherein the one or more performance characteristics comprise at least one of: acceleration rate, deceleration rate, steering ratio, or suspension firmness.

14. The computer program product of claim 8, wherein the vehicle features familiar to the user comprise vehicle autonomy level, wherein the program code instructions to provide emulation of the one or more features of the vehicle features familiar to the user in the unfamiliar vehicle comprise program code instructions to:

provide a warning to the user of autonomous control features present in the unfamiliar vehicle determined to be unfamiliar to the user.

15. The computer program product of claim 8, wherein the program code instructions to determine vehicle features familiar to the user comprise program code instructions to:

determine, from a vehicle familiarity index, vehicle features familiar to the user, and wherein the program code instructions to provide emulation of the one or more features of the vehicle features familiar to the user in the unfamiliar vehicle comprise program code instructions to provide emulation of the one or more features of the vehicle features familiar to the user based on a predefined degree of difference from features of the unfamiliar vehicle.

16. A method comprising:

receiving an indication of a user operating a vehicle determined to be an unfamiliar vehicle;

determining vehicle features familiar to the user; and providing emulation of one or more features of the vehicle features familiar to the user in the unfamiliar vehicle including emulation of a vehicle size familiar to the user in the unfamiliar vehicle by adjusting proximity alerts in the unfamiliar vehicle based on the vehicle size familiar to the user.

17. The method of claim 16, wherein the vehicle features familiar to the user comprise one or more of: vehicle size, vehicle performance, or vehicle autonomy level.

18. The method of claim 16, wherein the vehicle features familiar to the user comprise vehicle size, wherein providing emulation of the one or more features of the vehicle features familiar to the user in the unfamiliar vehicle comprises:

changing a distance at which proximity sensor alerts are generated.

19. The method of claim 16, further comprising phasing out the emulation of the one or more features of the vehicle features familiar to the user in the unfamiliar vehicle based on at least one of an elapsed time of the emulation or a number of miles traveled with the emulation.

\* \* \* \* \*